(12) United States Patent
Syed et al.

(10) Patent No.: US 9,872,081 B2
(45) Date of Patent: Jan. 16, 2018

(54) DIGITAL CONTENT SPATIAL REPLACEMENT SYSTEM AND METHOD

(71) Applicants: COMCAST CABLE COMMUNICATIONS, LLC, Philadelphia, PA (US); NBCUNIVERSAL MEDIA, LLC, New York, NY (US)

(72) Inventors: Yasser Fouad Syed, La Crescenta, CA (US); Thomas Bause Mason, Brooklyn, NY (US); Danial Elliott Holden, Denver, CO (US); Sheau Bao Ng, Wayland, MA (US)

(73) Assignee: NBCUniversal Media, LLC, Wilmington, DE (US)

( * ) Notice: Subject to any disclaimer, the term of this patent is extended or adjusted under 35 U.S.C. 154(b) by 0 days.

(21) Appl. No.: 14/518,928

(22) Filed: Oct. 20, 2014

(65) Prior Publication Data

US 2016/0112729 A1    Apr. 21, 2016

(51) Int. Cl.

| H04N 7/16 | (2011.01) |
| H04N 21/81 | (2011.01) |
| H04N 21/2343 | (2011.01) |
| H04N 21/2668 | (2011.01) |
| H04N 21/442 | (2011.01) |
| H04N 21/25 | (2011.01) |
| H04N 21/234 | (2011.01) |

(52) U.S. Cl.
CPC ..... *H04N 21/812* (2013.01); *H04N 21/23412* (2013.01); *H04N 21/234345* (2013.01); *H04N 21/252* (2013.01); *H04N 21/2668* (2013.01); *H04N 21/44218* (2013.01)

(58) Field of Classification Search
None
See application file for complete search history.

(56) References Cited

U.S. PATENT DOCUMENTS

| 7,464,394 | B1* | 12/2008 | Gordon | H04N 21/4344 |
| | | | | 725/39 |
| 2002/0194595 | A1* | 12/2002 | Miller | H04H 20/10 |
| | | | | 725/36 |
| 2010/0257551 | A1* | 10/2010 | Sweeney | H04N 7/165 |
| | | | | 725/34 |
| 2010/0312608 | A1* | 12/2010 | Shan | G06F 17/30867 |
| | | | | 705/14.54 |
| 2012/0057850 | A1* | 3/2012 | Klappert | H04N 21/23424 |
| | | | | 386/278 |
| 2012/0110627 | A1* | 5/2012 | Reitmeier | H04N 5/76 |
| | | | | 725/93 |
| 2012/0151346 | A1* | 6/2012 | McClements, IV | G06Q 10/101 |
| | | | | 715/716 |

(Continued)

*Primary Examiner* — Fernando Alcon
(74) *Attorney, Agent, or Firm* — Fletcher Yoder, P.C.

(57) ABSTRACT

A selected spatial portion of digital base content is selected, and one or more alternative content objects is selected to replace the spatial portion. The spatial portion may comprise less than a full frame of the base content, although it may span multiple frames, and may move within the successive frames. The replacement may occur before or after distribution of the content. The selections may be made based upon knowledge of general or specific audiences. The selections may facilitate bandwidth or processing, allow for product placements, or generally enhance the audience experience.

20 Claims, 5 Drawing Sheets

(56) References Cited

U.S. PATENT DOCUMENTS

| | | | |
|---|---|---|---|
| 2012/0210216 A1* | 8/2012 | Hurst | H04N 5/783 715/716 |
| 2014/0047464 A1* | 2/2014 | Lev | H04N 21/4223 725/12 |
| 2014/0085480 A1* | 3/2014 | Saptharishi | H04N 7/181 348/159 |
| 2015/0070357 A1* | 3/2015 | Tahan | G06F 3/14 345/428 |
| 2015/0113582 A1* | 4/2015 | Ushiyama | H04N 21/2662 725/115 |
| 2015/0373385 A1* | 12/2015 | Straub | H04N 21/2668 725/34 |

* cited by examiner

DIGITAL CONTENT SPATIAL REPLACEMENT SYSTEM AND METHOD

BACKGROUND

The present invention relates generally to the field of digital content preparation, creation, delivery, and playback, and particularly to the adaptation of content by spatial replacement of all or portions of base content.

Over the past decades, delivery of content to audiences (e.g., for entertainment, educational, and similar purposes) has evolved very significantly. Historically, films, books, and print matter were delivered by conventional cinemas, through the mail, and through retail establishments. Conventional television transmissions evolved from broadcast technologies to cable, satellite and digital delivery, such as via the Internet. While all of these technologies still exist in parallel, of increasing importance has been the delivery of content via digital means, and the adaptation of content to specific audiences, typically upon request. In many situations, audiences may still experience content on regular schedules, such as through linear broadcast, satellite and cable programming. However, increasingly audiences select times and places for reception and playback, using time shifting techniques, storage techniques, on-demand techniques, non-linear Internet-based content retrieval, and so forth.

While audiences may increasingly select particular content based at least in part on the particular device on which the content is to be experienced (e.g., television, computer, smartphone, etc.), there is increasing interest in adapting content for both large audiences, as well as for individuals with or without active participation of the audience. That is, it is commonplace for advertisements to be adapted for particular demographics, times, audiences, and even individuals. These advertisements may be added to or fed prior to, during or after desired content based upon detectable audience preferences, but typically simply placed into available slots ("avails") designated for commercial content. It has also become common to superimpose graphics, lines, text, advertisements, and so forth on base content. These may vary in transparency, and may direct the audience to optional content or activities. Enhancement in this area are still needed, however.

For example, apart from ad placement in specifically allocated timeslots, the adaptation of actual content based upon potential audience interest is not commonly performed today. In general, once compiled and prepared for distribution, the content itself is generally not altered, although certain minor supplements may be made to it, such as closed captioning, language options, and the like. Similarly, as noted, superimposed advertisements and recommendations are common with various types of content, but these have not been used to alter the content stream itself. Few or no successful attempts have been made at altering content based upon potential audience interest during the content experience.

The present disclosure addresses a number of exciting possibilities for altering and/or supplementing content distributed to audiences based upon a range of factors or "dimensions" that may better accommodate audience interests and preferences.

BRIEF DESCRIPTION

The present disclosure, in accordance with certain aspects, relates to a digital content delivery method that comprises selecting a spatial portion of digital base content to be replaced, and selecting one or more alternative content objects for replacement of the selected spatial portion. The selected spatial portion is replaced with the one or more selected alternative content objects to obtain altered digital content that is a combination of the base content and the one or more selected alternative content objects. The digital base content and the one or more selected alternative content objects are distributed for experience by an audience.

In accordance with yet another aspect, a digital content delivery system comprises a digital content processing system that, in operation, selects a spatial portion of digital base content to be replaced, selects one or more alternative content objects for replacement of the selected spatial portion, and a digital content altering system that, in operation, replaces the selected spatial portion with the one or more selected alternative content objects to obtain altered digital content that is a combination of the base content and the one or more selected alternative content objects. A digital content distribution system, in operation, distributes the digital base content and the one or more selected alternative content objects for experience by an audience.

In a particular embodiment, the disclosure sets forth a digital content delivery system that comprises an audience data collection system configured to collect audience activity data indicative of audience activity during playback of digital content, an audience environment collection system configured to collect audience environment data indicative of an audience environment during playback of the digital content, and a background data storage system configured to store audience background data indicative of a characteristic of the audience. A processing system is configured to determine a likely audience content interest based upon the audience activity data, the audience environment data, and the audience background data. A content adaptation system is configured to select a spatial portion of digital base content less than a full frame, to select an alternative content object, and to replace the spatial portion with the alternative content object based upon the determined likely audience content interest.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
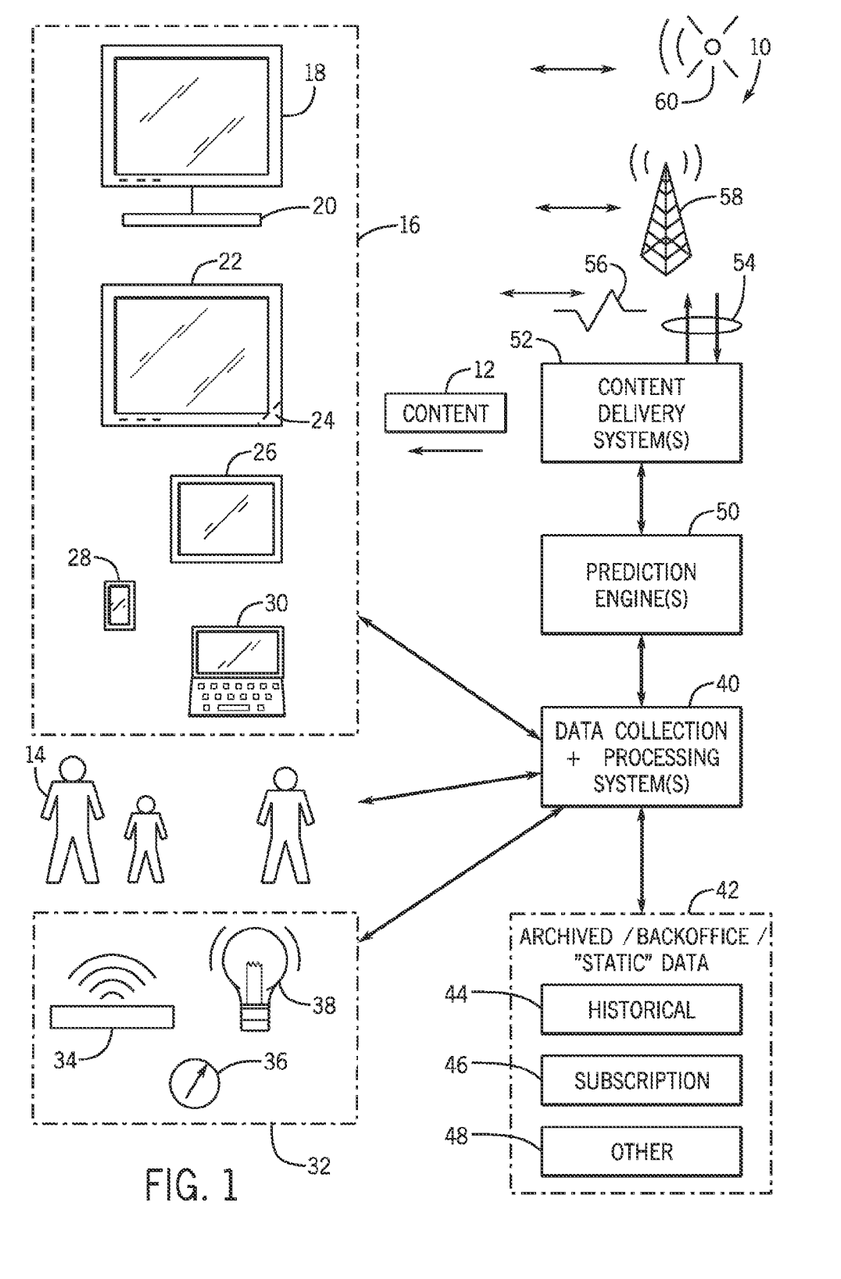
FIG. 1 is a diagrammatical representation of a digital content selection and delivery system adapted to alter delivered content based upon a range of factors in accordance with aspects of the present disclosure.

Turning now to the drawings, FIG. 1 illustrates an exemplary digital content selection and delivery system designated generally by the reference numeral 10. The system is designed to distribute content, indicated generally by reference numeral 12, to audiences 14. It should be noted that the content intended by the present disclosure may include a very wide range of offerings, such as television and film programming, videos, audio content, combined audio and visual content, content intended for both large and specific audiences, and so forth. The content may be altered as described below, and this alteration may both supplement and complement the content so that elements of the content may be stacked or superimposed upon one another and played or experienced together, or alternative content may be provided instead of specific portions of the content. Moreover, where available, such superposition, replacement or alteration may occur over specific desired times periods in the content played back. In general, however, the techniques are not simply the replacement of advertisements in specific timeslots as is performed in certain conventional technologies. Rather, the content itself may be altered, and more particularly, it is altered during the audience experience of the content.

Similarly, the audience to which the content is delivered should be understood to be both collective audiences and specific audiences, even to the level of an individual. Such collective audiences may, for example, include many consumers who experience the content at the same time or closely in time, such as through broadcast, satellite, cable and other media that distribute the content for consumption in accordance with regular schedules. However, the audience may also experience the content at different times, places, and manners, such as through time-shifting techniques, storage and recording of the content for later playback, through the use of various support media for the content, including digital media, disks, solid state and dynamic memory, and so forth.

In general, the audience will experience the content on one or more playback devices as indicated generally by reference numeral 16. In certain circumstances, the playback devices may include collective devices, such as cinemas and public displays. In many events, however, the playback devices will be provided in homes, businesses, automobiles, and other more limited venues. In the illustration of FIG. 1, the playback devices include, by way of example, a conventional television set 18 associated with a processing system, typically referred to as a cable, satellite or set-top box 20. As will be appreciated by those skilled in the art, the latter device often serves to receive the content, to decode the content, and to provide audio and visual signals to the television monitor and speakers for playback. Such devices may also exchange information with content providers in a bidirectional manner. Similarly, a playback device 22 in the form of an Internet-ready television will include circuitry, indicated diagrammatically by reference numeral 24, that is adapted to receive and process content, and in certain events to exchange data with the content provider as desired. In both of these scenarios, various supplemental devices, including modems, routers, streaming media devices, computers, and so forth may be associated with the sets to provide enhanced functionality (these devices are not separately illustrated in the figure). Still further, personalized devices such as tablets and hand-held computers, and monitors may be utilized as indicated by reference numeral 26. Other devices may include various types of smartphones and hand-held media players 28. Finally, various computers, laptops, and the like may be utilized as indicated by reference numeral 30. As with conventional and developing devices of this type, content may be received, decoded, and played back, but content may also be stored for later experiencing. Some or all of these devices may also be adapted for receipt and playback of content in real time or near-real time as the content is distributed. However, where storage and time-shifting techniques are utilized, timing is much more flexible. Where Internet distribution and other individualized content demand and receipt technologies are utilized, the content may be requested, distributed and played back in a highly individualized manner. That is, the additional, supplemental, or alternative content may originate from and/or be distributed by or retrieved form different sources than the base content.

Regardless of the particular device utilized, the particular audience targeted, or the particular content distributed, the present techniques allow for detection and consideration of many different factors, referred to herein sometimes as "dimensions", to determine and predict possible audience interest. Based upon such predictions, the content itself may be adapted to provide an enhanced audience experience. The present techniques allow for detection of certain data and alteration of the content as the content is being experienced by the audience. Thus, a tight time loop may be maintained in which audience feedback is obtained and adaptation of the content is made based upon many dimensions that may be indicative of audience appreciation, audience preferences, and a range of considerations (e.g., economic, commercial, cultural, community value, educational, among others). Moreover, the techniques allow for replacement of specific spatial portions of base content over a desired time period where alternative content objects are available and suitable for the receiving audience.

Among the data that may be considered for the predictions and adaptation of the content are various environmental factors, behavioral factors, and "static" factors. Environmental factors may include, for example, lighting, temperature, location, movement, and a wide and almost unlimited number of different considerations generally representative of the conditions in which content is being experienced by the audience. Events and behavioral factors will typically reflect the behavior of the audience members, including movements, gaze, and changes in content selection (e.g., requesting additional different content, changing a channel, increasing or decreasing audio volume, visiting websites or other content during the experience of the primary content, and so forth). "Static" data, which in fact may not be "static" in the sense that it is unchanging, is simply less frequently changing than the other factors, and may include information that is known or knowable by content providers that may be interesting or informative in predicting audience appreciation or interest. Many content providers will or can know such information, and examples are provided below.

In the illustration of FIG. 1, certain environmental devices are illustrated and indicated diagrammatically by reference numeral 32. These may include, for example, motion detection devices 34, including gaming systems, motion detectors, range cameras, and so forth. Temperature sensors and environmental control settings for the environment may be included (e.g., smart thermostats) such as indicated by reference numeral 36. Similarly, lighting and other factors and devices may be considered as indicated by reference numeral 38. Increasingly, these will be networked so that, where permitted by the audience members, settings and states of these devices can be detected, collected, and transmitted for consideration by content providers. The data collected in this manner will typically be of interest insomuch as it may affect the experience of the audience with respect of the content. Thus, alteration of the content may be made to enhance the experience based upon audience behaviors, environmental factors, and so forth. It may be noted that in some applications the present technology may be used to enhance features such as accessibility of the content. For example, lettering may be changed (e.g., rendered easier to read). Objects could be replaced with alternative objects that indicate sounds coming from them (e.g., a radio could change color when music is played from it).

One or more data collection and processing systems 40 serve to receive and process this data. In addition, a vast array of archived, back office and generally "static" data may be available as indicated by reference numeral 42. By way of example, in the simplified illustration of FIG. 1, this may include certain historical data 44, such as data representative of content that the audience has selected and experienced in the past, behaviors of the audience in the past, environmental conditions under which certain content was experienced in the past, and so forth. Certain subscription information 46 may also be available, and this will typically be more static, although it may change or be changed by the audience from time to time. Subscription information may include, for example, certain channels or content types of providers for which the audience has paid or subscribed, the utilization of such subscription services, and so forth. Other "static" data may also be considered as indicated by reference numeral 48. A wide range of such data may be available, including data related to location of the audience (i.e., "presence"), the type of device utilized by the audience, available bandwidths of the devices and infrastructure, demographics in the local area in which the audience is located, purchases, preferences, and so forth that were made by the audience, and the like.

Based upon some or all of this available information, the data collection and processing systems may implement various algorithms that may be developed and refined over time to make predictions of audience interest in particular content through the use of one or more prediction engines as indicated by reference numeral 50. It should be noted that the data collection and processing systems and the prediction engines will often be implemented in one or more computer systems which will most often be remote from the location in which the content is experienced. These systems may collect the information via Internet connections, data storage and data libraries (particularly for the "static" data) and process the information to determine possible audience interest. The interest will most often be also based upon the particular content being distributed and experienced. The techniques enable a sophisticated approach to the compilation and definition of the content so that various adaptations may be pre-defined and made "on the fly" as the content is experienced based upon the collected and processed data. The content itself is thus alterable in real or near-real time based upon predictions of audience interest. Moreover, a loop is closed as described below so that predictions may be refined and changed if it is determined that alterations and content have not likely enhanced the audience experience.

Ultimately, one or more content delivery systems is called upon to distribute the content to the audience. Such content delivery systems may include or be adapted for two-way communication as indicated generally by reference numeral 54. That is, one or more content streams may be "pushed" to the audience, and this may occur at the same or different times, depending upon the technologies for distribution. Where two-way communications are provided, such as via certain satellite, cable, Internet and similar systems, data may be retrieved from the audience by the same or parallel channels. Illustrated in FIG. 1 are three exemplary distribution technologies, including the Internet 56, broadcast technologies 58, and cable and satellite technologies 60. Any other current or future developed technologies may also be utilized for distribution of the content and for retrieval of certain data useful in making the predictions and adaptation of the content.

Figure 2:
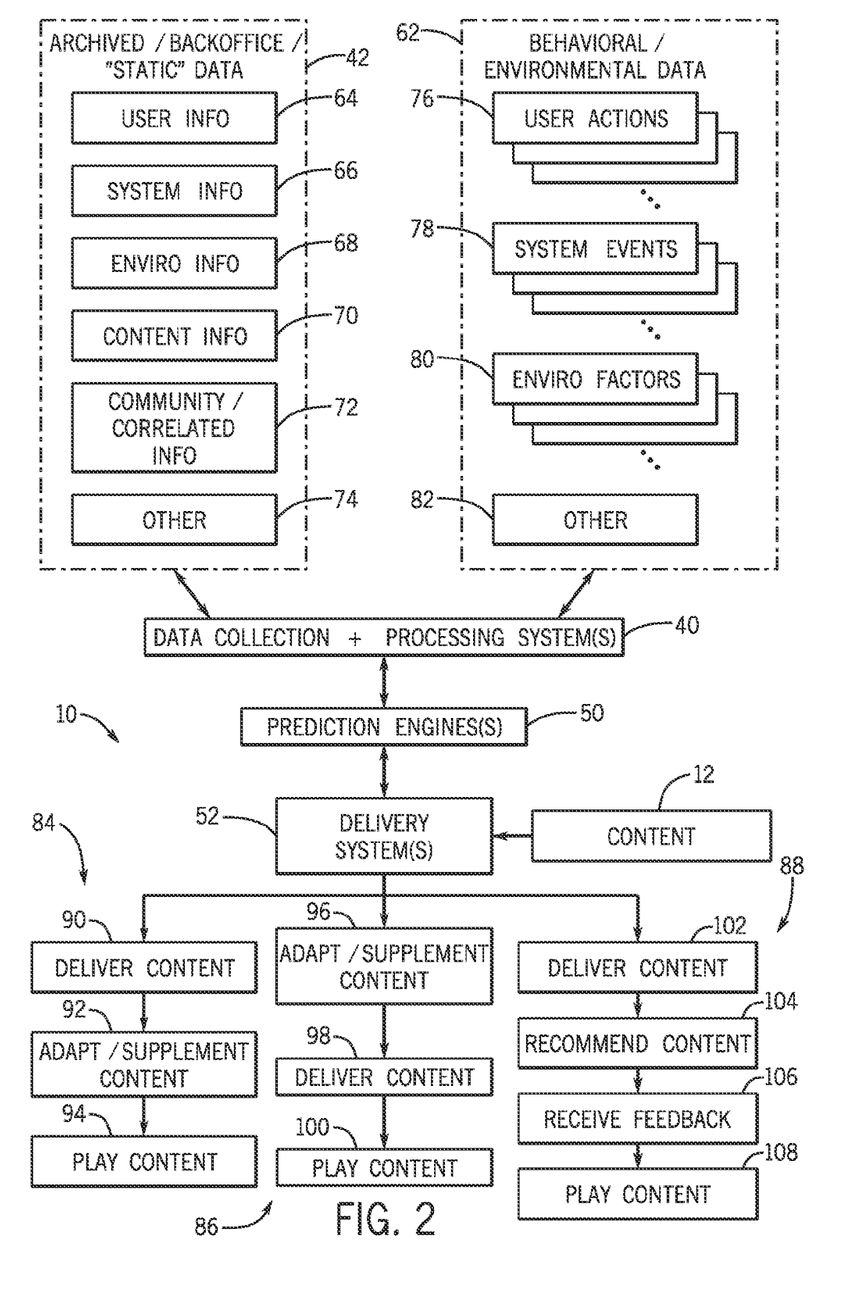
FIG. 2 is a more detailed diagram of certain data and factors utilized in the adaptation and delivery of the content.

FIG. 2 illustrates certain of the considerations and scenarios for data collection, content adaptation, and content delivery in accordance with the presently contemplated embodiments. The system 10 is again adapted to deliver content based upon a range of detectable events and factors. In the illustration of FIG. 2 these are grouped as archived/back office/"static" data 42, and behavioral/environmental data 62. It should be noted, however, that a wide range of content-based data may also be considered, including the nature of the content, classifications of the content, content length, content age, content audience targeting, languages, and so forth.

In the illustration of FIG. 2, the "static" data may include a range of information that is known or knowable by the processing system and prediction engine. These may include, for example, user information 64 that is established by content providers based upon subscriptions, pre-communicated and stored data, and the like. Such user information may also include, however, information collected from other sources, such as user profiles, demographics, income, user tendencies and preferences, households, individuals, and so forth. System information 66 may also be collected and certain of this information may also be known by virtue of subscriptions or paid services of the content providers. However, such system information may also include, for example, data collected from devices themselves, including past connections, content and information stored on the device, "cookies" stored on the device, preferences and settings stored on the device, and so forth. Environmental information 68 may also be accessed. In general, this environmental information is different from the media environment in the venue in which the content is experienced. The environment information 68 may include, for example, times at which the content is experienced, weather conditions, seasons, and so forth. As discussed above, various content information 70 will typically be of interest, and this may be accessed directly from the content or by reference to content libraries, metadata, and so forth. Community and correlated information 72 may be considered as well. This information may include, for example, local demographics of a community, community preferences, neighborhood data, social communities to which the audience or venue belong, and so forth. Various other data may also be considered as well, as indicated generally by reference numeral 74.

The behavior and environmental data 62 will typically be much more specific and faster changing. The ability to detect and make decisions based upon such data enables the techniques to be highly dynamic so that time resolution and reaction speeds are greatly enhanced as compared to heretofore known techniques. Among the behavior and environmental data that may be accessed and considered are user actions, these actions may include, for example, the presence or absence of the audience members, the number of audience members present, movements and activities of audience members, audience member gaze, where this may be determined, verbal activities of audience members (e.g., whether audience members are talking or reacting to the content), audience members moving out of or into a viewing area, and so forth. System events 78 may be detected, typically from devices that are present in the area and that are networked to provide system feedback. In simple situations such events may include whether the audience members have selected different content, changed a channel, requested additional or different content on the same or another device present, and so forth. However, other system events may include, for example, whether audience members have searched for relevant information on smartphones, computers, tablets and other devices present in the region where the content is experienced. Similarly, pausing, backing up, fast forwarding, and similar system events (e.g., how long s piece of content is played, whether the audience has watched a whole program or stopped early) may be detected and considered. Environmental factors 80 will also typically be of interest. These may include, for example, temperatures in the venue, lighting conditions, noise levels, whether audience members are present or potentially experiencing the same or other content in other rooms, and so forth. Many other behavior and environmental data may be considered as well, as indicated by reference numeral 82. Essentially, these are only limited by the ability to detect and convey the data to the processing system for predicting audience interest, monitoring audience interest and correlating these to potential alterations in the content.

These various types of data are provided to the data collection and processing systems as indicated by reference numeral 40. Based upon the data, then, one or more prediction engines 50 may process the data and determine possible audience interest levels so that content may be altered, additional or different content may be provided, recommendations may be made, and so forth. For example, a t-shirt or other article visible in a scene may be replaced based upon detected and analyzed data and potential audience interest or preferences. As will be appreciated by those skilled in the art, the prediction engines will typically be implemented in the form of computer algorithms that correlate the available data with available alterations in the content. The predictions and alterations may be based upon a wide range of factors, first and foremost the enhancement of the audience experience. Other factors may be considered as well, however, such as advertising budgets and advertising goals, commercial considerations, sales considerations, audience values and possible future interests, and so forth. Based upon the selection of available content alterations resulting from the evaluation by the prediction engines, the delivery systems 52 access content 12 and deliver the content to the audience.

FIG. 2 illustrates three different scenarios for content alteration and delivery, although a wide range of different scenarios may also be envisaged and implemented. Those shown in the figures are intended as exemplary only. In the illustration of FIG. 2, for example, in a first scenario 84 content is delivered to the audience as indicated by reference numeral 90, and the content is either adapted or supplemented following delivery as indicated by reference numeral 92. It should be noted that the content may originate from or be distributed by or retrieved from different sources. The content is then played to the audience as indicated by reference numeral 94. It should be noted that there are yet other scenarios detailed below for how and where the content is altered for playback. It should also be noted that these scenarios may be implemented where the content is played back as it is delivered (real or near-real time) as well as for time-shifted playback based upon content storage, delays and pauses made in the playback, and so forth.

In a second exemplary scenario indicated generally by reference numeral 86, the desired content is adapted and/or supplemented prior to delivery. In this type of scenario, the distributor of the content may perform the adaptation based upon predicted audience interest and only the adapted content is conveyed to the audience for playback. Thus, following collection of data, prediction of audience interest, selection of the particular adaptation desired, and completion of the adaptation, as indicated at reference numeral 96, content is delivered as indicated at reference numeral 98, for playback by the audience as indicated at reference numeral 100. It may be noted that this could be performed in the network during distribution.

The present techniques also allow for at least some degree of audience participation in the adaptation process. In the scenario indicated by reference numeral 88 in FIG. 2, for example, rather than perform the adaptation either on the audience side or the distribution side, a recommendation or suggestion is made to the audience. In the exemplary logic illustrated, this scenario begins with delivery of content as indicated at step 102. Based upon analysis of collected data and prediction of audience interest in various options, one or more recommendations may be made at step 104. Such recommendations may be made in any desired manner, such as by superposition of text or graphics on a playback device, messages, text, graphics or other indicia on other devices that the audience member may have available, audible indicators, and so forth. The audience may accept or not accept such recommendations, and may provide feedback to the content provider. The feedback may, for example, be in the form of a signal or data generated by selection of a button, a region or display, a selection on a remote control or hand-held device, and so forth. At step 106, this feedback is received by the content provider, and the adaptation and/or supplementation of the content may be made, and the content played as indicated at step 108. As noted above, in certain scenarios the present techniques rely upon collection of data, analysis of data, and a prediction made of possible audience interest in content, adapted content, supplemental content, and so forth.

Figure 3:
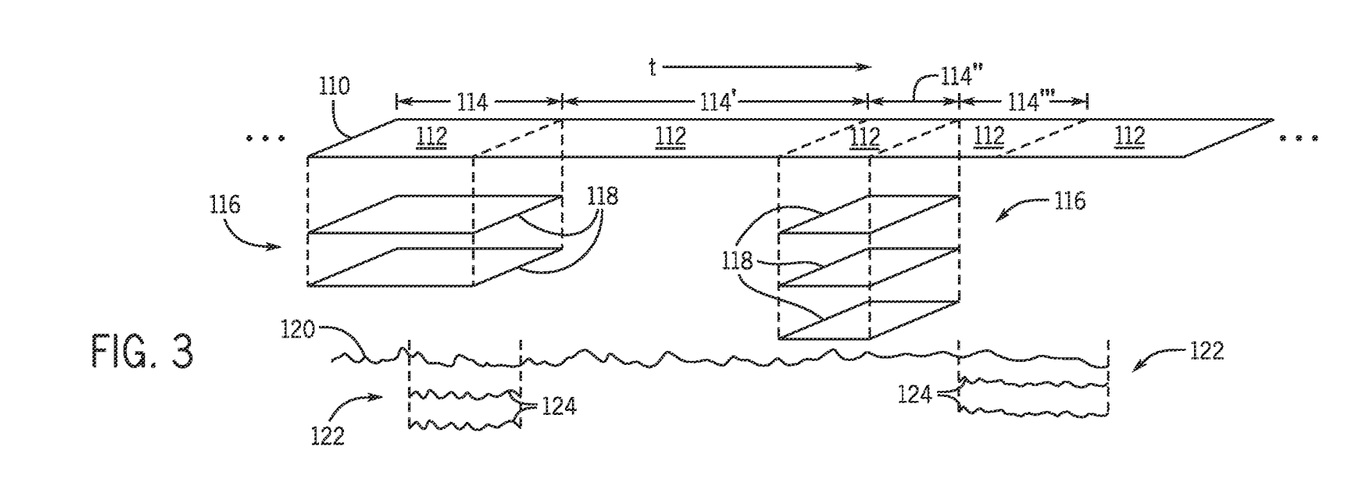
FIG. 3 is a diagrammatical representation of a base content stream with alternative replacement "content objects" that can replace the base content spatially when available and desired.

One form of additional or adapted content is replaced content that may be transmitted, coded, decoded, stored, and/or played back instead of or in addition to some or all of basic content. FIG. 3 is a diagrammatical representation of one scenario for replacement of portions of digital content as it is delivered or after delivery to an audience. In the illustration, the digital content 110 is represented as a stream comprising scenes or data that proceeds in time. As will be appreciated by those skilled in the art, this representation is somewhat similar to conventional representations of film or tape-based content, although it should be understood that in practice such supports may or may not exist, and where they do not exist the representation may correspond to a stream of data, data stored on a storage medium, or any similar technology. The base content 110 generally comprises segments 112 which define the entire video content in this scenario, and for any particular times or lengths of time. It is noted in the figure that these segments need not be the same length, as indicated by reference numerals 114, 114', 114", and so forth. Replacement content may exist for certain of these segments as indicated by reference numeral 116. For such segments one or more alternative segments 118 may exist. In general, in the present context such alternatives are considered "objects" which can be placed into the content stream in place of the base content. That is, while such objects could be superimposed on or played with the base content, in certain scenarios it is contemplated that the objects entirely replace the base content at least for the desired segments. In general, these segments may be termed "portions" of the base content. Similarly, audio data 120 is often provided with the base content and may form part of the base content. As will be appreciated by those skilled in the art, the audio content may comprise a single channel, or multiple channels, depending upon the nature of the content, the nature of the playback device, and so forth. As will be appreciated by those skilled in the art, various techniques may be used for audio processing and adaptation. For example, audio data is typically edited using "tracks" (e.g., dialogs, effects, background music, etc.), and the final composition is then "mixed" into multiple channels (e.g., left, right, center, etc.). Newer constructs may treat some or all of the audio data as "objects" that can be inserted, superimposed, and so forth. Any and all of these techniques may be used in the present context. Here again, the audio content may include segments for which replacement content 122 is available. This replacement content may, similar to the video content, comprise one or more alternatives which may also be considered as "objects" in the present context. It should further be noted that while the audio content is typically coordinated and synchronized with the video content, the audio alternative objects may or may not correspond in time with the video alternative objects. This is true both of the time placement of the audio objects as well as the duration of these.

In the present context, the treatment of content and content segments as "objects" may have significant advantages. For example, it is presently contemplated that the objects may comprise pre-established computer-executable code, such as in accordance with object-oriented programming technologies. Moreover, it is contemplated that a "content object" may be an image that may reside over multiple frames (such as a pictorial element, say, a painting or image that replaces a painting in the background of a scene). An object could also be a video (e.g., replacing an embedded moving image of a television program on the display of a television set that is in the scene). In another example, an object may be tied to an application that tallies or displays results originating from local community activity (e.g., displayed on a portion of an audience device display). An object may also be associated to a link (e.g., a link that provides information on where to buy dress, that that creates a web browser object). In another example, an object can have permissions or security (e.g., in a program having a criminal scene, the object may allow for either hiding or revealing innocent faces). In another example, an object can altered to fit an intended display (e.g., a lower third of a screen on a device, but adapted to fit tablet, television set, or cell phone). Moreover, layers may provide a connectedness, organization for display or transmission (e.g., objects that are intended for display on a 4K set; of various possible object choices for soda can image replacement coming from a soda distributor), or context. Similarly, a layer may contain multiple objects (e.g., red overlays to indicate stress fractures in a bridge that is displayed as a video). Layer with multiple objects may vary over time (e.g., red overlays to indicate stress fractures in a bridge as pressure is applied to it). In a similar manner, the objects may be executed to provide visual indicators of traits of content elements, such as sound, temperature, possible accessibility tie ins (e.g., an object can create a layer with musical notes to indicate speaker layout in a room, flashing to indicate self destruct). In the audio context, sound indicators of traits of content objects could indicate motion of the objects, smell, possible accessibility tie ins (e.g., in a virtual reality game of Marco Polo, where the object can be assigned as the goal). Layers may also be programmed in association to a video frame (such as ⅓ down and fitted to the display). Further, still objects may be programmed in association to a scene (such as replacing soda or beverage can in a scene). Still further, content objects can provide a "localness" to the video (e.g., a local television station logo or other indicator). Also, content objects may have a shape trait (e.g., round, rectangular, 2D or 3D). Such shape characteristics can be used to help place or fit objects in a scene.

In general, then, the present techniques allow for selective replacement of portions of digital content, both video and audio, at desired times and for desired durations. The replacement may, as summarized above, be based upon considerations such as audience preferences, audience interests, audience behavior, background information, historical information, and so forth. In certain contexts, however, the segments and objects may be considered based upon such factors as network performance, bandwidth utilization, available bandwidth, buffering rates, frame rates, and so forth. Thus, all or a portion of the base content may be replaced for certain durations by alternative objects where available. These alternatives may comprise entirely different content that is possibly of greater interest to the audience, including scenes, music, product placements, language variations, adult scenes, scenes better adapted for younger audiences, and so forth.

Figure 4:
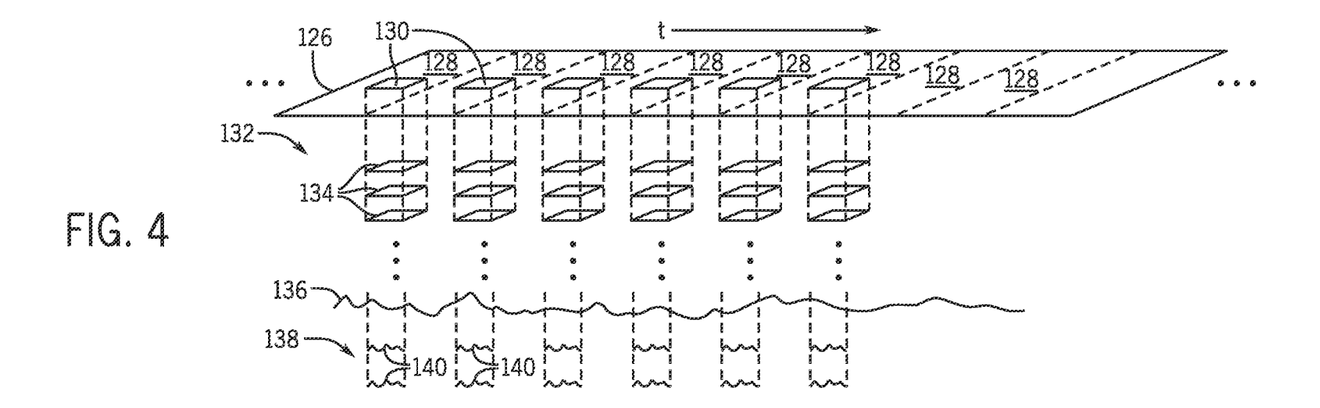
FIG. 4 is a diagrammatical representation of another base content stream with another scheme for spatial replacement of portions of the base content.

In the scenarios summarized in FIG. 4, base content 126 is similarly represented as a stream of content that comprises multiple segments, in this case which may correspond to frames 128. As will be appreciated by those skilled in the art, in conventional media, such frames corresponded to individual photographs or depictions that literally comprised frames that successively provided the impression of movement within a scene. In a more modern context, such frames may in fact comprise data alone which can be coded and decoded to create a similar experience for the audience. Thus, while the term "frames" may be used in the present context, it should not be interpreted as being limited to physical frames on film or in a similar support.

In the embodiment of FIG. 4, the base content 126 proceeds in time through the series of frames 128. Selected portions 130 of each frame may be available for receiving replacement content as indicated by reference numeral 132. This replacement content, here again, may consist of one or more alternatives, denoted as object to the present context. These alternative video objects 134 may be available for some or all of the frames, and may occupy only a portion of the frames as opposed to complete replacement as summarized in FIG. 3. Moreover, the video alternative objects may run through a series of frames as indicated in FIG. 4, with other frames not being available for replacement of the same portions. In a similar manner, the audio content 136 may have replacement content 138 associated with it. Such replacement content may be available for the same frames or for different frames, and the particular audio alternative objects 140 may or may not correspond to the video alternative objects in time.

The scenarios outlined in FIGS. 3 and 4 allow for selective layering or replacement of base content portions on an object by object basis. That is, the objects will typically be created beforehand, and in certain cases at the time that the base content is also created. The objects may be alternatives in a story line, or may be adapted, for example, to certain audiences. The replacements, when layered, may overlie one another or overlie the base content in any desired manner. That is, the layering may take the form of complete replacement of all or a portion of the base content for a desired segment, or the layering could allow for some degree of transparency similar to techniques used in the art. In all of these cases, however, the replacement content may provide the alternative objects both temporally and spatially. That is, it is considered particularly unique that the entire frame or frames of the base content need not be replaced, but only portions of the content are replaced in the video scenes. Such replacement or layering allows for very unique alternatives as compared to existing technologies. It should also be noted that where only limited spatial portions of the base content are replaced or overlaid, these portions need not be in the same spatial locations from frame to frame or from segment to segment. Thus, an element that moves from frame to frame or from segment to segment may be replaced by an alternative object and the replacement may trace the movement of the original element in the affected frames or segments.

Figure 5:
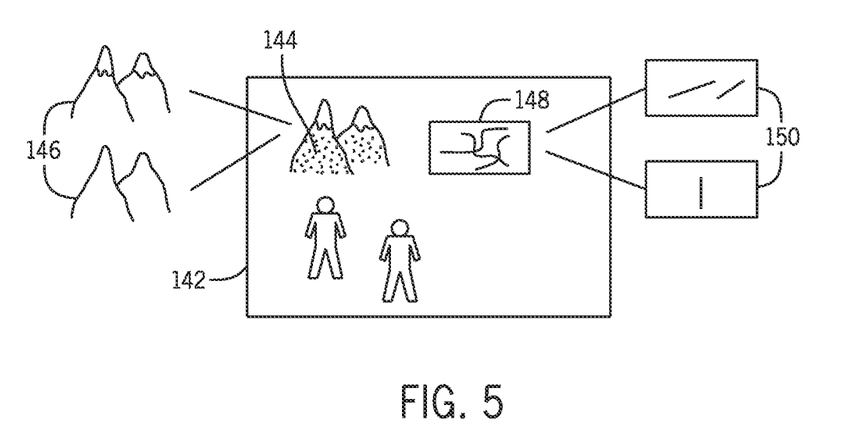
FIG. 5 is a diagrammatical representation of an exemplary scene in base content illustrating examples of element replacement by alternative content objects.
Figure 6:
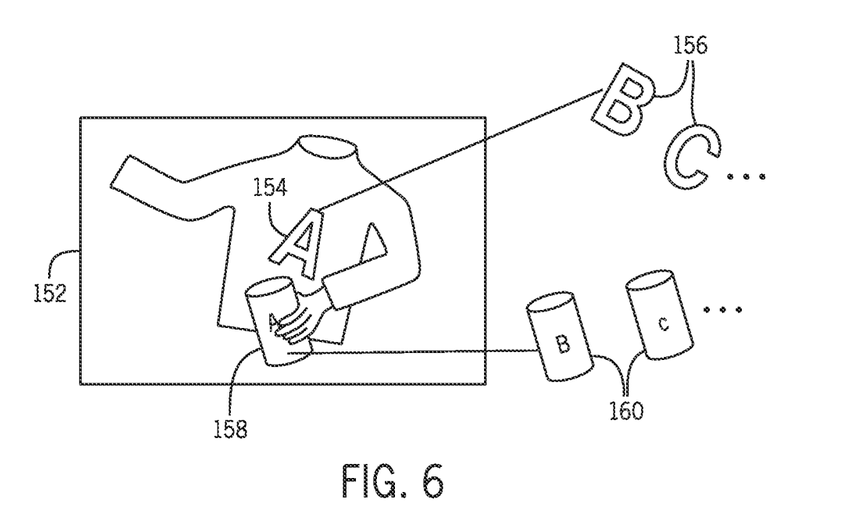
FIG. 6 is a similar diagrammatical representation of an exemplary scene in base content illustrating examples of element replacement by alternative content objects for commercial or advertising purposes.

FIGS. 5 and 6 illustrate examples of object replacement in scenes where only a portion of the scenes are replaced. FIG. 5, for example, shows a scene 142 comprising people, landscapes, and articles. Landscapes 144 may be presented as they would be in the base content, while alternative views as indicated by 146 may entirely replace only this portion of the base content. By way of example, in the illustration, the base content may show mountains with forests in the base content, while alternatives may eliminate the forest, simplifying the view, or eliminate other features, such as snow caps in the mountains. Such alternatives may allow for artistic license, reduction or control in bandwidth utilization, appealing to local interests or individual interest of the detected audience, and so forth. Further example, in FIG. 5 is an element 148 visible in the scene. By way of example, this element could be a billboard or artwork visible in the scene. In the illustration the original content as a complex composition that may utilize substantial bandwidth. Alternative objects 150 may simplify this, providing better utilization of the bandwidth. Similarly, the element may comprise a view or composition that may be of interest in the base content, while the alternative objects may be determined to be of greater appeal to a particular audience, in such cases the entire scene may be replaced as summarized with respect to FIG. 3, or just these individual, spatially separated elements may be replaced as summarized with respect to FIG. 4. It should also be noted that entire regions of the scene could be replaced, including backgrounds, landscapes, architectural components, or any desired element or group developments. Again, this may be done for the entire scene or for selected portions of the scene only.

FIG. 6 illustrates a scenario in which graphics, visible elements, clothing, and so forth may be replaced in a similar manner. The scene 152 in this case includes a sweater or sweatshirt on which a graphical element 154 is visible. The element may correspond, for example, to a team logo, a university name, or any other desired indicia. Alternative objects 156 may then be layered or replaced over this element where desired. In this case it will often be desired to perform such layering or object replacement based upon some detected feature of the audience, such as the audience background, audience affiliations, audience demographics, geographical locations of the audience, and so forth. Another object 158 is visible in the scene 152, comprising a beverage container. The container in the base content has a logo or other indicia "A" visible, which may be a brand or known container graphic. Alternative objects 160 may be available for replacement of this element. Clearly, such options for selective spatial content layering or replacement allow for enhance potential for product placement, advertising, adaptation to local or specific audiences, and so forth. A myriad of possibilities will become apparent to those skilled in the art as well as to marketing, creative, and other content designed and production teams.

Figure 7:
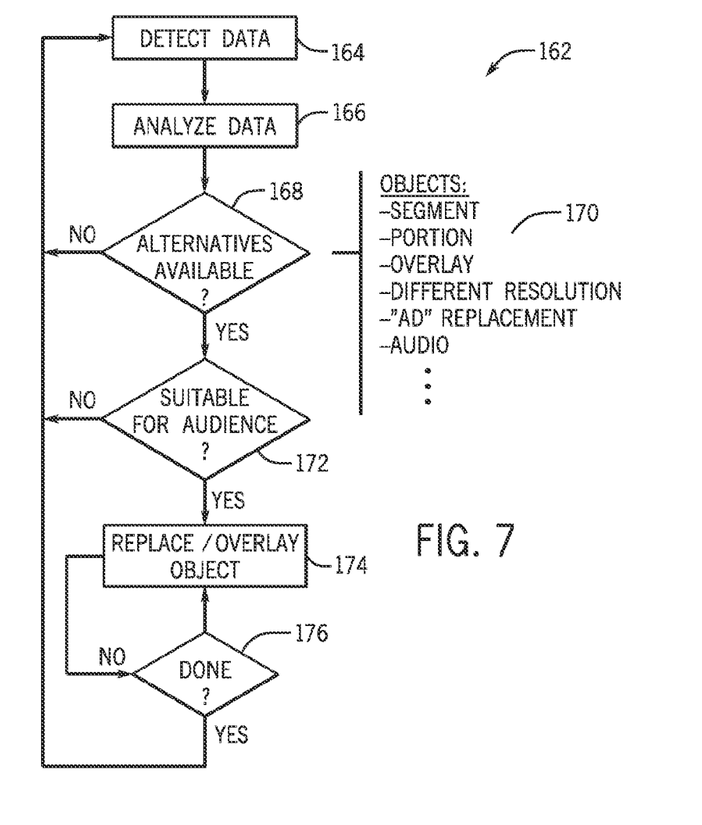
FIG. 7 is a flow chart illustrating exemplary logic that may be used to determine whether and how to replace spatial portions of base content.

FIG. 7 illustrates exemplary logic for carrying out certain of the layering or content replacement outlined above. The process, designated generally by reference numeral 162 begins with the detection of data at block 164. As noted above with respect to FIGS. 1 and 2, such detection may comprise protection of data related to audiences, historical data subscription data, archived or "back office" data, system information, environmental information, content information, community or correlated information, and also indications of user actions, system events, environmental factors, and so forth. Thus, a wide range of data may be collected and analyzed to determine whether one or more video and/or audio alternative objects may be drawn upon to enhance the audience experience. The analysis is then performed as indicated at step 166. This analysis may take any suitable form, including predictions of possible audience interest as discussed above. In general, the analysis will determine one or more objects should be drawn upon for complete or partial replacement of scenes, audio content, and so forth. Based upon the analysis, then the process determines whether alternatives are available as indicated at block 168. It may be noted that the analysis performed will typically drive the choice of alternatives if and when one or more are available. This, in the logical flow of FIG. 7, block 168 may logically be placed before blocks 164 and 166. Technically blocks 164 and 166 may proceed in parallel, such that a decision whether to perform a replacement, superposition, etc., is determined in the case that an alternative is available. If alternatives are available, the process may advance to block 172. If not, the process continues and may continue on a cyclical or even-driven basis. Alternatives 170 may take the form of objects that may be placed within, supplemented to, overlaid on top of or beneath, or simply replace portions of the base content, both video and/or audio. As indicated in FIG. 7, such objects may comprise video or audio segments, portions of these, overlays, video and/or audio content of a different resolution or data volume or rate, "ad" replacements, and so forth. It should be noted that such "ad" replacement is different from those used in the prior art, particularly where only reduced spatial portions of the content are replaced, such as for product placements and so forth as outlined with respect to FIGS. 3 and 4. If such alternatives are available, the logic may determine whether the replacement is suitable for a particular audience as indicated at block 172. If not, the process may cycle back and continue. If the replacement is suitable and desired for the audience, the replacement and/or overlay of the objects may take place as indicated at steps 174. As indicated at block 176, such replacement may continue until a particular segment or desired portion of the base content is completed. Thereafter, the process may continue as before.

It should be noted that the logical process outlined in FIG. 7 may, in fact, take place multiple times and in an overlapping fashion. That is, multiple portions of the base content, both video and audio, may be replaced by alternative objects, and these objects and their replacement may extend over overlapping portions of the base content. Thus, one or more product placements may be made in one segment or a portion of base content, while other product placements, bandwidth adapting objects, and so forth may occur in the same or other spatial locations within the base content. The same is true for audio content replacement. It should be further noted that it is presently contemplated that the replacements may take place in accordance with any desired scenario for transfer and processing of the data. That is, as outlined above with reference to FIG. 2, the base content and any alternatives may be delivered already combined from a content distributor. Alternatively, these may be transmitted to an audience device and combined at the audience device, such as in a process sometimes referred to "late binding". Still further, certain of the content, particularly the alternative objects may exist and be provided later than the base content, particularly where the base content is experienced in a time-shifted manner due to recording, pausing, support on an alternative medium (e.g., disks, solid state memory, etc.).

Figure 8:
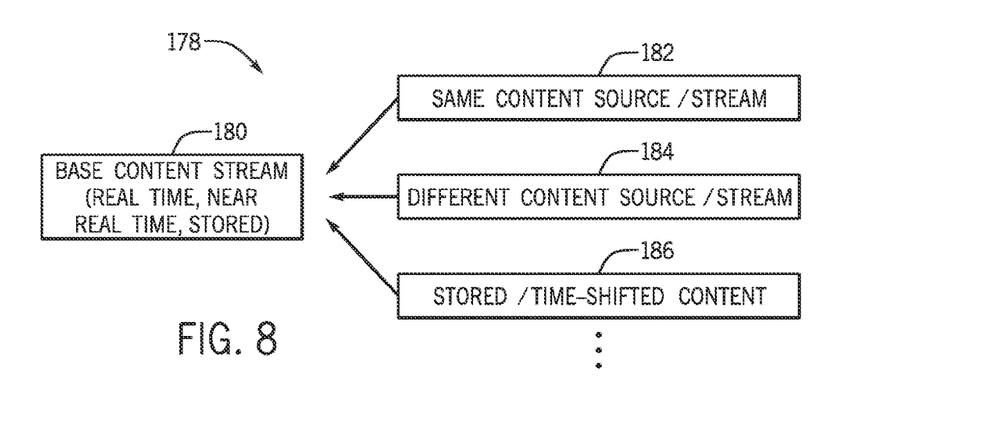
FIG. 8 is a diagrammatical representation of content replacement in base content from one or more sources or alternative content.

FIG. 8 illustrates that the various portions of content may, in fact, originate from difference sources. The content flow, indicated generally by reference numeral 178 includes the base content stream 180. It is contemplated that certain of the replacements, or all of the replacements will be performed as the content is being experienced by the audience. That is, the base content is experienced in realtime with its distribution, or near realtime (e.g., slightly after its distribution to the audience) or in a stored or time-shifted manner. In all of these scenarios, however, rather than simply superimpose or combine additional or complimentary content in a conventional manner, the alternative objects replace portions of the base content as the base content is being experienced or close in time to the experience. Such temporal replacement allows for a high degree of adaptability to audience-related factors as summarized above with respect to FIGS. 1 and 2. The particular sources of the alternative objects may vary, and many such sources may be used. FIG. 8 illustrates, for example, that the alternative objects may be included in a stream with the base content from the same source. Such scenarios include both streaming of data by any digital means, the Internet broadcast, satellite, cable, and so forth, as well the support of the content on any digital medium, such as solid state memory, disks, and so forth. As indicated by reference numeral 184, a different content source or stream maybe utilized, and the combination of the base content and the alternative objects may be made at the client side, such as through late binding. Still further, as indicated at reference numeral 186, stored or time-shifted content may be provided, particularly where the base content is experienced at a time later than its distribution. Such alternative objects are time adapted insomuch as they may be more relevant to the time of the content experience then other alternative objects that could have been experienced earlier in time. By way of example, product placements, event notices, references to current or past events, and so forth may make more sense and enhance the audience experience if adapted to the time that the base content is experienced by the audience.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A digital content delivery method comprising:
selecting a spatial portion of digital base content to be replaced, wherein the digital base content is to be distributed for experience by an audience;
selecting one or more alternative content objects for replacement of the selected spatial portion of the digital base content, wherein the one or more alternative content objects are associated with a suitability time period;
selecting the one or more alternative content objects further based on bandwidth utilization, available bandwidth, buffering rates, frame rates, or any combination thereof in distribution or playing back the digital base content;
replacing the selected spatial portion of the digital base content with the one or more selected alternative content objects to obtain altered digital content that is a combination of the digital base content and the one or more selected alternative content objects; and
distributing the digital base content and the one or more selected alternative content objects for experience by the audience, such that the one or more selected alternative content objects are only displayed during the suitability time period.

2. The method of claim 1, wherein the digital base content and the one or more selected alternative content objects are distributed prior to replacing to obtain the altered digital content.

3. The method of claim 1, wherein the digital base content and the one or more selected alternative content objects are combined to obtain the altered digital content prior to distributing.

4. The method of claim 1, wherein at least selecting of the spatial portion and selecting the one or more alternative content objects are performed while the audience is experiencing the digital base content.

5. The method of claim 1, wherein at least replacing of the selected spatial portion is performed while the audience is experiencing the digital base content.

6. The method of claim 1, wherein at least distributing the digital base content and the one or more selected alternative content objects is performed while the audience is experiencing the digital base content.

7. The method of claim 1, wherein the one or more selected alternative content objects spatially replace less than a full frame of the digital base content.

8. The method of claim 7, wherein the one or more selected alternative content objects spatially replace one or more specific elements visible in one or more frames of the digital base content.

9. The method of claim 8, wherein the one or more selected alternative content objects spatially replace the one or more specific elements in multiple frames of the digital base content, and wherein locations of the one or more specific elements are different in the multiple frames.

10. The method of claim 1, wherein selecting the one or more alternative content objects is based upon data collected from the audience.

11. The method of claim 1, wherein selecting the one or more alternative content objects is based upon predicted interest of the audience.

12. The method of claim 1, wherein the one or more alternative content objects are selected based upon a desired product placement.

13. A system comprising at least one processor configured to:
- select a spatial portion of digital base content to be replaced;
- select one or more alternative content objects for replacement of the selected spatial portion based on bandwidth utilization, available bandwidth, buffering rates, frame rates, or any combination thereof in distribution or playing back the digital base content;
- replace the selected spatial portion with the one or more selected alternative content objects to obtain altered digital content that is a combination of the digital base content and the one or more selected alternative content objects; and
- distribute the digital base content and the one or more selected alternative content objects for experience by an audience,
- wherein, when the digital base content and the one or more selected alternative content objects is experienced in a time-shifted manner, the one or more selected alternative content objects comprise one or more time-shifted-relevant objects that may be different from alternative objects that could have been experienced earlier in time.

14. The system of claim 13, wherein the at least one processor comprise a processor disposed on an audience-side device to replace the selected spatial portion.

15. The system of claim 13, wherein the at least one processor is configured to select the spatial portion and the one or more alternative content objects while the audience is experiencing the digital base content.

16. The system of claim 13, wherein the at least one processor is configured to replace the selected spatial portion while the audience is experiencing the digital base content.

17. The system of claim 13, wherein the one or more selected alternative content objects spatially replace less than a full frame of the digital base content.

18. The system of claim 17, wherein the one or more selected alternative content objects spatially replace one or more specific elements visible in one or more frames of the digital base content.

19. A non-transitory computer-readable medium having computer executable code stored thereon, the code comprising instructions for:
- selecting a spatial portion of digital base content to be replaced, wherein the digital base content is to be distributed for experience by an audience;
- selecting one or more alternative content objects for replacement of the selected spatial portion of the digital base content, wherein the one or more alternative content objects are associated with a suitability time period;
- selecting the one or more alternative content objects further based on bandwidth utilization, available bandwidth, buffering rates, frame rates, or any combination thereof in distribution or playing back the digital base content;
- replacing the selected spatial portion of the digital base content with the one or more selected alternative content objects to obtain altered digital content that is a combination of the digital base content and the one or more selected alternative content objects; and
- distributing the digital base content and the one or more selected alternative content objects for experience by the audience, such that the one or more selected alternative content objects are only displayed during the suitability time period.

20. The system of claim 13, wherein the at least one processor is further configured to:
- collect audience activity data indicative of audience activity during playback of the digital base content;
- collect audience environment data indicative of an audience environment during playback of the digital base content;
- store audience background data indicating of a characteristic of the audience, wherein the one or more alternative content objects is further selected based upon the audience activity data, the audience environment data, and the audience background data.

* * * * *